United States Patent [19]

Pogue

[11] Patent Number: 5,611,291
[45] Date of Patent: Mar. 18, 1997

[54] AERATOR AND SEEDER FOR UNTILLED PASTURE LAND

[75] Inventor: Gary E. Pogue, Kenedy, Tex.

[73] Assignee: Pogue Seed Co., Inc., Kenedy, Tex.

[21] Appl. No.: 627,030

[22] Filed: Apr. 3, 1996

[51] Int. Cl.$^6$ ...................................................... A01C 7/08
[52] U.S. Cl. ................. 111/14; 111/200; 172/21
[58] Field of Search .................. 172/21, 22; 111/182, 111/181, 14, 189, 200

[56] References Cited

U.S. PATENT DOCUMENTS

| | | | |
|---|---|---|---|
| 4,192,387 | 3/1980 | Stinson | 172/21 |
| 4,196,678 | 4/1980 | Lore et al. | |
| 4,258,634 | 3/1981 | Lore et al. | |
| 4,360,065 | 11/1982 | Jenison et al. | |
| 5,207,168 | 5/1993 | Comer | 172/21 X |
| 5,353,724 | 10/1994 | Wheeley, Jr. | 172/21 X |
| 5,450,910 | 9/1995 | Strzyzewski | 172/21 X |
| 5,460,229 | 10/1995 | Mattis | 172/21 |
| 5,488,917 | 2/1996 | Santoli et al. | 172/21 X |

Primary Examiner—Terry Lee Melius
Assistant Examiner—Christopher J. Novosad
Attorney, Agent, or Firm—Cox & Smith Incorporated

[57] ABSTRACT

A combined soil agitation and aerating apparatus comprises a frame which is pulled by a tractor over untilled pasture land. A cylindrical drum is rotatably supported on the frame by a co-rotatable axial shaft. A plurality of rigid prongs are provided on the cylindrical surface of the drum which penetrate, agitate and aerate the soil as a drum is rolled over the land to be seeded. A seed dispensing unit is mounted behind and parallel to the drum and is driven by a driving connection with the shaft that rotatably supports the drum.

10 Claims, 3 Drawing Sheets

AERATOR AND SEEDER FOR UNTILLED PASTURE LAND

FIELD OF THE INVENTION

This invention relates to farm equipment, and particularly to an apparatus for concurrently agitating, aerating and seeding untilled land of the type that generally is only suitable for use as pasture.

BACKGROUND OF THE INVENTION

Summary of the Prior Art

In many parts of the country, the nature of the land precludes its usage for any farming activity other than as a pasture for cows, sheep, horses and other livestock. The contour of the land may prevent tillage by conventional equipment, even though a tractor can be driven over most of the area. In many areas in Texas, for example, the soil depth is severely limited by underlying limestone formations. Scattered rocks interfere with the operation of conventional aerating and planting equipment. Weeds, cactus, mesquite, and other undesirable vegetation may cover large areas. Nevertheless, certain pasture grasses can grow and thrive in such environment if the seed can be planted in soil that has been sufficiently disturbed to be aerated.

Millions of acres in West Texas and Northern Mexico are inhabited by sparse, scattered forb and brush plants but with very little or no grass. It is not wise or practical to destroy this habitat with heavy, earth moving machinery for the purpose of planting grass seed. This is a brittle environment and wind and rain erosion of the soil could destroy the ecological balance if the heavy equipment method is used.

Also, millions of acres of improved, warm season permanent pastures, such as bermuda and kleingrass, are planted and established in the United States. Where rainfall is sufficient, many operators desire to overseed these perennial pastures in the fall with annual winter forage seed, such as ryegrass or oats, to obtain grazing for the entire year. This is presently done by slow, expensive, inefficient methods such as pulling chisels through the grass and then overseeding. The chiseling method is energy intensive, slow and leaves the pastures very rough. Till planting drills are not used and soil aeration is not accomplished with drills. Plows and planters are another method, but plows can damage the existing grass.

Most planting equipment is designed for use on tilled ground. The most common seed deposition mechanisms employ a ground engaging, rubber tired wheel for rotating a seed dispensing shaft. In the type of untilled pasture land for which this invention is designed, such wheels are continuously bouncing up and down, thus repeatedly loosing contact with the ground, and interrupting or at least varying the flow of seed to the soil being traversed by the tractor. When aeration of such soil is attempted by discs, spring tooth or rotary fork harrows, tool breakage is intolerably high, due to the presence of scattered rocks, tree roots or limestone deposits close to the soil surface. For example, when only one spike or disc of a harrow strikes a rock, the entire weight of the planting and aerating equipment is applied to that single spike or disc, resulting in the deformation, if not the destruction thereof.

SUMMARY OF INVENTION

This invention provides a combination aerating and planting apparatus that over comes the above stated problems of the prior art apparatus and permits the successful growing of pasture grasses in adverse soil environments, such as untilled pasture land.

A typical apparatus embodying this invention has a tractor drawn frame having two laterally spaced main beam members. A hollow drum or tank is journaled for rotation on such beam members, with the axis of rotation being horizontal and perpendicular to the direction of movement of the tractor. No wheels are provided on the frame except for transport to the field to be seeded. The wheels are then moved upwardly relative to the frame so that the hollow drum rolls along the ground. If only part of the drum encounters an obstacle, the drum wall is strong enough to carry the entire weight of the apparatus over the obstacle.

To effect the aeration of the soil over which the drum rolls, a plurality of spikes or prongs are rigidly secured in substantially equi-spaced, helical relationship over the entire external surface of the drum. Such prongs are forwardly inclined relative to a radius extending from the axis of rotation of the hollow drum to the base of the prong. Thus each prong enters and agitates the adjacent soft, thus effecting aeration of such soft. The openings created by the prongs will also allow moisture penetration.

To minimize breakage of the aforementioned prongs, each prong is reinforced by a plate element which is welded to the rear face of the respective prong and to the surface of the drum immediately behind the prong. The plate surfaces of the plate element are thus parallel to and aligned with the respective prong.

The drum is preferably rotatably mounted on the two main frames by stub shafts which project outwardly from end plates sealably secured to each end of the drum. Alternatively, a unitary shaft may traverse the entire drum and project beyond each end plate to form two stub shafts. The total weight of the drum can then be substantially increased by filling the drum with water, the density of which can be increased by the addition of a soluble solid, in the same manner employed for tractor tires. Thus the weight of the drum is increased to a level that insures that some part of the drum is always in engagement with the ground, so that the drum is always rotating at a speed determined by the tractor.

To apply the desired pasture seed, a conventional rotatable seed dispensing apparatus is mounted on the two main frame members at a position rearwardly of, and parallel to the rotary drum. A suitable power driven connection is provided between one of the stub shafts and the main shaft of the seed dispensing apparatus. Such power drive could be a direct gear drive or a chain, and may include a clutch to permit the operator to shut off the flow of seed when making turns at the end of the field. The important thing is that the seed dispensing apparatus is continuously working, regardless of the adverse terrain conditions.

It is generally desirable to pack the seed dropped on the aerated soil. Any conventional roller can be pulled by a cross beam secured to the rear ends of the main beams to effect compaction of the disturbed soft around the deposited seed.

Further objects and advantages of this invention will be readily apparent to those skilled in the art from the following detailed description, taken in conjunction with the annexed sheets of drawings which illustrate the presently preferred embodiment of the invention.

DESCRIPTION OF PREFERRED EMBODIMENT

Figure 1:
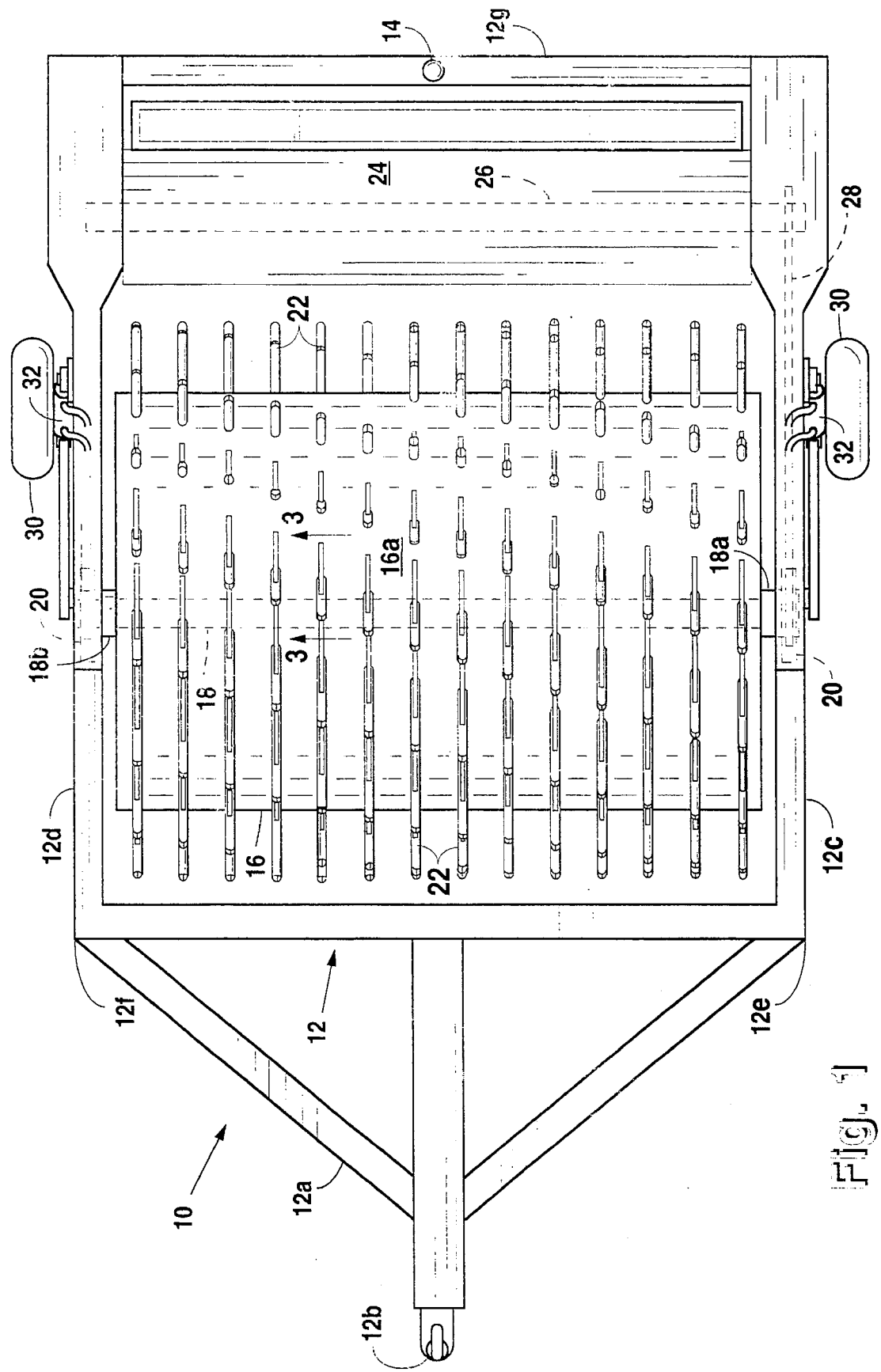
FIG. 1 is a top plan view of a combined aerator and seeder embodying this invention.
Figure 2:
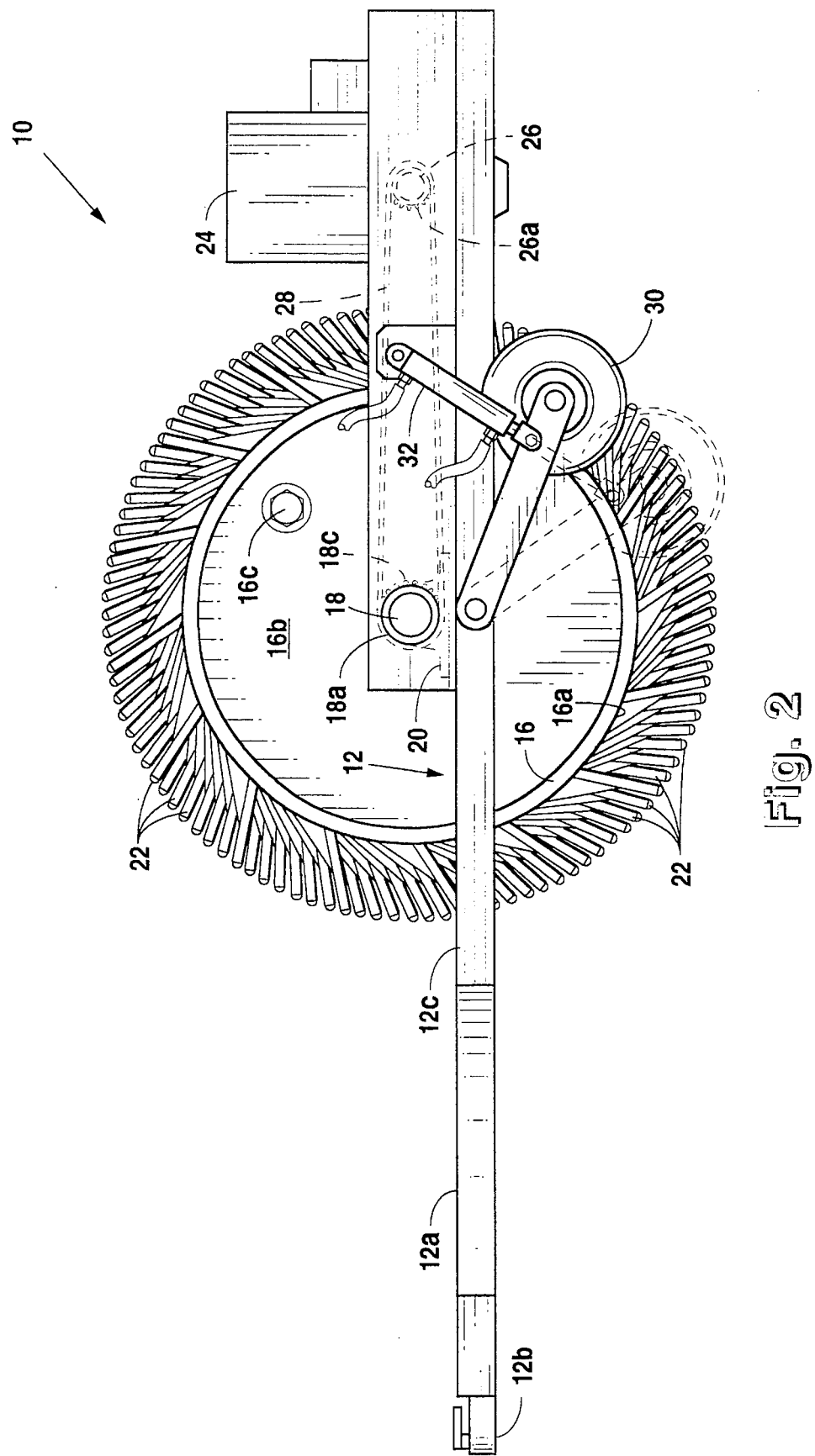
FIG. 2 is a side elevational view of FIG. 1.

Referring to the drawings, a combined aerator and planter 10 embodying this invention comprises an articulated frame 12, preferably formed by welding, and including a generally triangular hitch portion 12a having a conventional socket 12b adjacent it forward vertex for engagement with a fixed ball commonly provided on the rear end of a farm tractor (not shown). Thus, frame 12 is pulled by the tractor, but has universal pivoting movement relative to the pulling tractor.

Frame 12 further includes a pair of laterally spaced, parallel support beams 12c and 12d which extend rearwardly from welded connections respectively to the rear vertices 12e and 12f of triangular hitch portion 12a. A transverse beam element 12g rigidly interconnects the rearward ends of support beams 12c and 12b. A hitching ball 14 may be provided on the center of transverse beam element 12g for a purpose to be hereinafter described.

A hollow drum 16 is provided having a cylindrical external wall 16a and two end covers 16b welded thereto. Drum 16 is mounted on the two support beams 12c and 12d in perpendicular relation thereto and f Such rotatable mounting may be accomplished by two stub shafts 18a and 18b respectively rigidly secured to the end covers in axially projecting relation. Preferably, a continuous shaft 18 is coaxially mounted within drum 16 and the ends thereof are rigidly and sealably secured to the end covers 16b and project beyond the end covers 16b to provide the stub shafts 18a and 18b.

Stubshafts 18a and 18b are respectively journalled in two bearings 20 which are mounted on the support beams 12c and 12d respectively.

Figure 3:
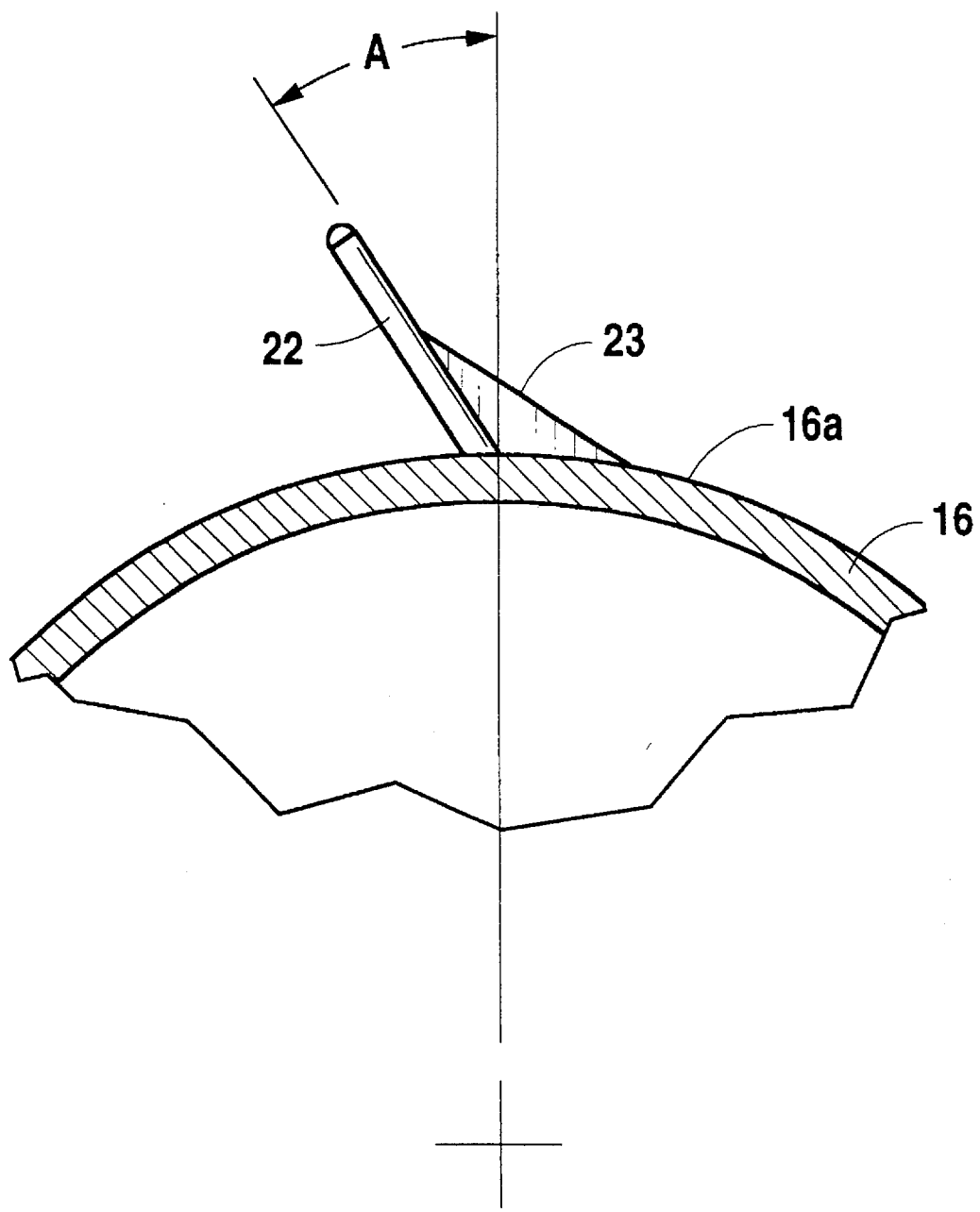
FIG. 3 is a partial sectional view taken on the plane 3—3 of FIG. 1.

To perform a soft agitating and aerating function, the cylindrical surface 16a is provided with a plurality of rigid pointed end prongs 22 which are preferably welded to drum surface 16a in a equi-spaced helical pattern. Most importantly, and as illustrated in FIG. 3, each prong 22 is forwardly inclined relative to the direction of rotation of drum 15 so that a radius drawn from the axis of drum 16 to the base of every prong will define an acute angle A with the axis of the prong. In my experience, such acute angle should preferably be between 20 to 45 degrees from maximum soft penetration and agitation. I preferably employ an angle of inclination of about 30 degrees.

The prongs 22 obviously are subjected to a variety of impact forces when the frame 12 is pulled over untilled pasture land. Many times, the entire weight of the apparatus 10 will be supported on a single prong as the drum 16 rolls over a rock. To increase the working life of prongs 22, the prongs 22 are preferably formed from a ductile iron or an iron alloy. Additionally a generally triangular, metallic reinforcing plate 23 is welded between the rear surface of each prong and the adjacent portion of the drum surface 16a, as best shown in FIG. 3. The plate surfaces of the reinforcing plate 23 lie in alignment with the lateral sides of prongs 22 to provide optimum support for the respective prong 22.

Rearwardly of the drum 16 and parallel therewith is mounted a conventional seed dispensing hopper 24. Seeds are dispensed along the entire length of seed hopper 24 by rotation of a dispensing shaft 26 which lies along the bottom portions of the hopper 24 to produce a seed planting mechanism operable by rotation of shaft 26. As shown by the dotted lines in Figures I and 2, the seed dispensing shaft 26 is rotated by a driving connection with at least one of the stub shafts 18a and 18b. Such driving connection preferably comprises a chain drive 28 interconnecting a pinion 18c on one of the stubshafts 18a and 18b and a chain gear 26a secured to one end of the seed dispensing shaft 26.

In operation, the frame 10 is pulled over the ground to be seeded by a tractor and the drum 16 rolls over such ground. The prongs 22 enter the ground and agitate and aerate the ground. To insure penetration of the prongs 22 in very hard, compacted soil the total weight of the frame 10 and drum 16 may be substantially increased by filling the drum with a heavy liquid, such as water or a concentrated solution of salt in water. A filling hole and plug 16c is provided in one of end covers 16b.

In any event, the penetration of the prongs 22 into the soft is assured, thus insuring that the drum will be rolling over the ground as long as the tractor is pulling same. The rotation of drum 16 assures the continuous rotation of the seed dispensing shaft 26, thus assuring the continuous deposit of seed onto the agitated, aerated soft.

To further optimize the germination of the deposited seed, a conventional roller (not shown) may be connected to the trailer hitching ball 14 provided on the rear transverse beam 12g to provide a compacting action of the loosened soft over the deposited seed.

It is generally necessary to transport the combined aerator and planter 10 to a working area over roads or lanes. To prevent damage to road and lane surfaces, a pair of transport wheels 30 are conventionally pivotally mounted on the side of support beams 12b and 12c and are lowered to a ground engaging position lower than the prongs 22. Thus the apparatus 10 may be moved over road and lane surfaces without producing damage by prongs 22. The pivotal positions of wheels 30 are determined by double acting cylinders 32 which are actuated in conventional fashion from the hydraulic system normally found on tractors.

From the foregoing description of the combined aerator and seeder, those skilled in the art will recognize that a significant increase in forage may be produced on untilled pasture land with a minimum of time and expense and without incurring significant breakage of the ground engaging portions of the apparatus. Modifications of the preferred embodiment of the invention herein described will be really apparent to those skilled in the art, and it is intended that the appended claims will include such obvious modifications within their scope.

I claim:

1. A seeder for untilled pasture land comprising, in combination:

an articulated frame having two laterally spaced longitudinal beams having forward and rear ends two angularly converging beams respectively connected to said forward ends of said longitudinal beams to form a vertex portion forwardly of the forward ends of said longitudinal beams;

ball means for connecting said vertex portion to a tractor for universal pivotal movement relative to the tractor;

a cylindrical drum having closed end portions and stub shafts projecting out of each said end portion of said drum in coaxial relation thereto;

bearing means on each of said laterally spaced longitudinal beams for respectively journaling said stub shafts for rotation about a horizontal axis perpendicular to said laterally spaced longitudinal beams;

a seed planter mounted on said laterally spaced longitudinal beams in parallel relationship to said cylindrical drum and rearwardly thereof;

said seed planter having a rotatable seed dispensing mechanism for discharging pasture type seeds along the full length of said planter;

a plurality of outwardly projecting prongs on the exterior of said cylindrical drum constructed and arranged to penetrate, aerate and agitate the soil by rotation of said cylindrical drum as said articulated frame is pulled over the soil by a tractor to effect rotation of said cylindrical drum about its axis; and means on one of said stub shaft portions for driving said rotatable seed dispensing mechanism by the rotation of said cylindrical drum for spreading pasture seed over the broken soil produced by said outwardly projecting prongs.

2. The seeder of claim 1 wherein said cylindrical drum and said end portions are sealably connected to define a fluid chamber to be filled with a heavy density liquid to increase the weight of said cylindrical drum and the soil penetrating forces on said outwardly projecting prongs.

3. The seeder of claim 1 wherein each said outwardly projecting prong is forwardly inclined in the direction of rotation of said cylindrical drum relative to a radius of the axis of said cylindrical drum extending through the base of said prong.

4. The seeder of claim 1 wherein each said outwardly projecting prong is reinforced against bending forces produced by impact with rock or roots by a plate element welded between each said prong and the surface of said cylindrical drum, each said plate element lying behind the respective prong in the direction of rotation of said cylindrical drum.

5. The seeder of claim 4 wherein said cylindrical drum and said end portions are sealably connected to define a fluid chamber to be filled with a heavy density liquid to increase the weight of said cylindrical drum and the soil penetrating forces on said outwardly projecting prongs.

6. A seeder for untilled pasture land comprising:

an articulated frame having means on its forward end for pivotal attachment to a tractor, and a pair of support beams laterally spaced relative to the direction of movement of said frame;

a cylindrical drum having end walls secured to an axial shaft extending outwardly through both end walls of the drum to define stub shafts;

axially aligned bearing means on each of said support beams for respectively mounting said stub shafts and said cylindrical drum for rotation about a horizontal axis perpendicular to said direction of movement;

an elongated seed dispenser having a rotatable operating shaft extending longitudinally within said seed dispenser;

means for mounting said seed dispenser rearwardly adjacent to said drum with said operating shaft parallel to said axial shaft;

means for drivingly connecting said axial shaft to said operating shaft, whereby seed is dispensed by the rotation of said drum; and a plurality of prongs secured to the cylindrical surface of said drum in outwardly projecting relation, whereby said prongs penetrate, agitate and aerate the soil over which said drum is rolled by the pulling movement of the tractor.

7. The seeder of claim 6 wherein said drum comprises a hollow cylindrical tube sealably secured to said end walls, and said end walls are sealably secured to said axial shaft, whereby the interior of said drum may be filled with a heavy liquid to increase the weight of said drum and the soft penetration of said prongs.

8. The seeder of claim 6 wherein each of said outwardly projecting prongs is forwardly inclined in the direction of rotation of said drum to define an acute angle relative to a radius of said drum extending through the base of the respective one of said prongs.

9. The seeder of claim 6 wherein said acute angle of each said prong relative to said radius is in the range of 20 to 45 degrees.

10. The seeder of claim 6 wherein each said outwardly projecting prong is reinforced against bending forces produced by impact with rocks or roots by a plate element welded between the rear face of each said prong in the direction of rotation of said drum and the external cylindrical surface of said cylindrical drum, each said plate element having its plate surfaces aligned with the respective prong in the direction of rotation of said drum.

* * * * *